No. 846,006. PATENTED MAR. 5, 1907.
M. D. BRYSON.
RULER.
APPLICATION FILED DEC. 29, 1905.
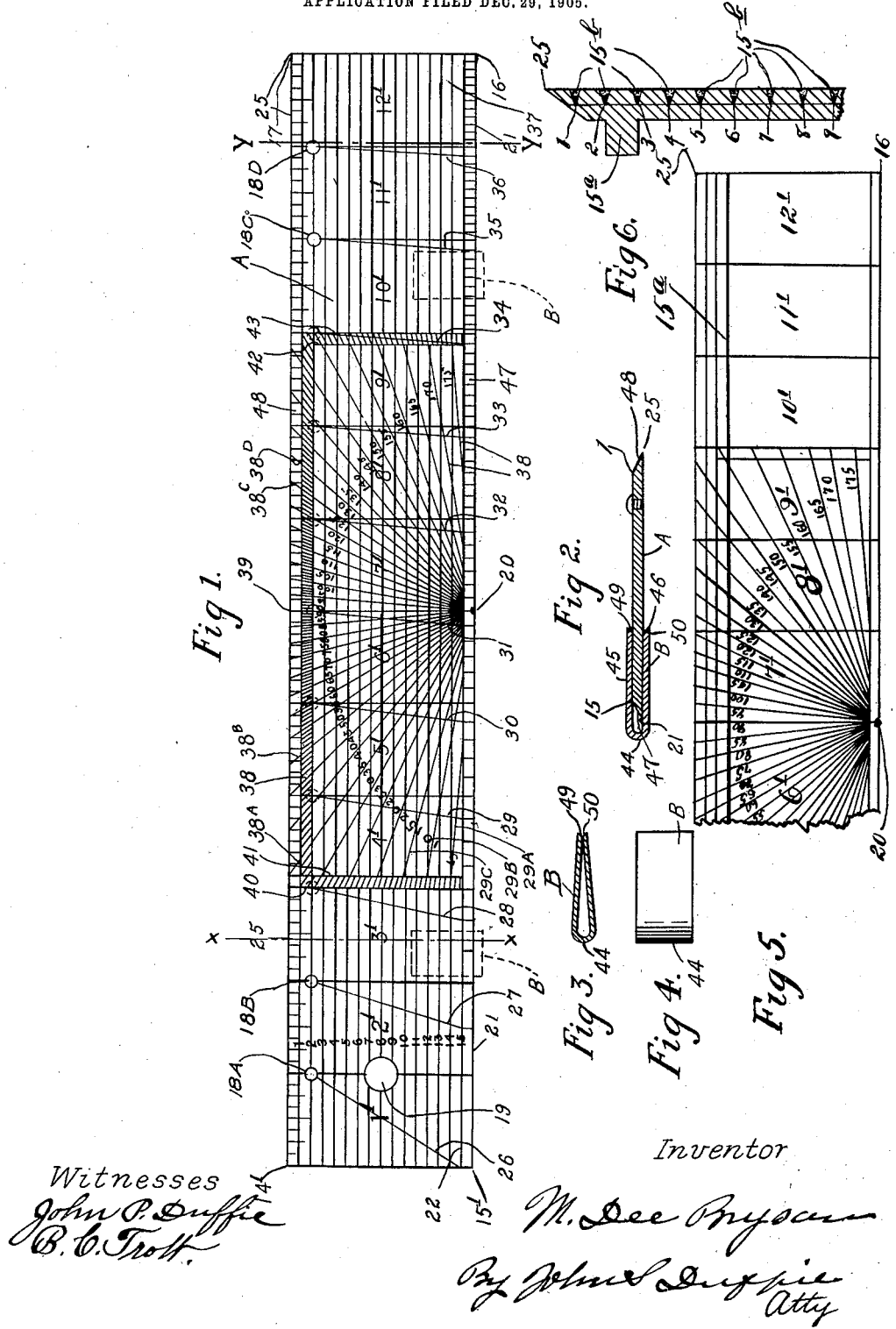
Witnesses
John P. Duffie
B. C. Trott
Inventor
M. Dee Bryson
By John S. Duffie
Atty

UNITED STATES PATENT OFFICE.

MILTON DEE BRYSON, OF LOS ANGELES, CALIFORNIA.

RULER.

No. 846,006.  Specification of Letters Patent.  Patented March 5, 1907.

Application filed December 29, 1905. Serial No. 293,772.

*To all whom it may concern:*

Be it known that I, MILTON DEE BRYSON, a citizen of the United States, residing at Los Angeles, in the county of Los Angeles and State of California, have invented new and useful Improvements in Rulers, of which the following is a specification.

My invention has relation to new and useful improvements in transparent rulers.
My ruler is provided with such improvements as facilitates both speed and accuracy in drawing vertical parallels, in drawing all angles, in measuring fractions of space, &c.

It is durable, presents a nice appearance, is convenient to use, and is susceptible of a great number and variety of uses.

The principal features of this ruler arise from the fact that it is practically transparent. It is made of a transparent strip about two inches wide or it may be of a greater or less width and from one-twentieth to one-fourth of an inch in thickness, depending on the length of the ruler. The length of the ruler may be from four to twenty inches, according as the demand shall require and as shall prove most convenient in use. This transparency enables a person using the ruler to see the paper immediately under the ruler and to know the relative position of the line about to be drawn. With the ordinary opaque ruler the lines under the ruler would be hidden from view. Therefore with such a ruler it would be impossible to get the relative position of lines, as before stated. All lines, scales, and marks of whatsoever character are drawn on the under side of this ruler. This enables the user to obtain absolute accuracy, because the marks, scales, &c., being on the under side, are therefore in direct contact with the paper and the lines on the paper. It thus becomes an easy matter to accurately get an angle or draw another parallel line with the one already drawn by simply placing line upon line and drawing a single line along the edge of the ruler.

Another important feature arises from the fact that the transparency of this ruler enables its construction to afford the universal angle-scale. This scale consists of straight lines radiating from a common point. (See Fig. 1, numeral 20.) Said numeral 20 is on the under side of the ruler and at the center of the length thereof.

The first line, numeral 29$^A$, diverges from the edge of the ruler at an angle of five degrees, the second line 29$^B$ at an angle of ten degrees, the third 29$^C$ at fifteen degrees, and thus on up to one hundred and eighty degrees, each of the radiating lines being five degrees apart. To illustrate, let us suppose a person using this ruler wishes to draw an angle of five degrees. To do this, he lays the five-degree-angle line 29$^A$ so that it will exactly cover the base-line on his paper. The paper can be plainly seen through the transparent body of the ruler. A line then drawn along the edge of the ruler will make a five-degree angle with the base-line. In the same way the forty-five-degree-angle line 38 of the ruler laid to cover the base-line on the paper will make by drawing a line along the base of the ruler (indicated by numeral 21) an angle of forty-five degrees with the base-line. Likewise any given angle may be drawn by the use of this ruler at a single stroke, whereas an architect using any implement except this ruler must by the old method hunt through his instrument-box for a particular triangle cut for that angle, or he must by the use of dividers and a straight-edge make by computation the desired angle, or by the use of the semicircle, scale, or protractor he may point off the correct angle, then lay down his protractor, pick up his straight-edge, draw a line from the point he has made to the correct angle to the point at the middle of the base-line of the protractor. Not one of these processes except this ruler enables the drawer to get any angle at a single stroke of the pencil. It will therefore be seen at a glance that this ruler takes the place of all instruments in the architect's outfit of tools except those tools used for drawing and establishing curved lines. Consequently the convenience and time saved by the use of this ruler is apparent.

Bookkeepers frequently find it necessary to rule off a page of their book in vertical columns of equal or given width. They may by the use of this ruler draw such lines rapidly yet accurately, due to the fact that each inch of the ruler is marked by a line crossing the width of the ruler at right angles to the edge thereof. When one of these lines is laid on the book so as to cover one of the horizontal lines on the page, then the edge of the ruler is exactly at right angles to the horizontal ruling of the book. Owing to the fact that the width of the ruler is divided by horizontal lines one-eighth of an inch apart,

(see numerals 1, 2, 3, 4, 5, 6, 7, 8, 9, 10, 11, 12, 13, 14, and 15,) the user may rule off his book in columns of any width from one-eighth of an inch to two inches or more.

This ruler has, in some cases, extending upwardly from its upper face and from near its upper edge a flexible projection 15$^a$, about one-eighth of an inch tall, the entire length of the ruler. In other cases round-headed tacks (see numerals 18$^A$, 18$^B$, 18$^C$, and 18$^D$) are set one inch apart on the upper face and near the upper edge of the ruler, the round heads of the tacks being about one-eighth of an inch tall. The purpose of said projections or said tacks is to raise the edge of the ruler when it is laid upper side down. Thus a line may be drawn with a common writing-pen without smearing the paper.

This ruler is flexible to a great degree. It may be even bent end to end without injury. A bookkeeper needs a ruler which will conform to the uneven surface of a spread-open book on which he is working. The stiff wooden ruler does not conform to the uneven surfaces of an open ledger. The average bookkeeper using the ordinary writing-pen to rule his book finds it almost impossible to draw a satisfactory line with it. Therefore the flexibility of this ruler is of great advantage, inasmuch as it allows the ruler to lay close to the paper. This is particularly an advantage in cases where the edge of the ruler is used as a marker to guide the eye along a line of figures.

The small markers or clamps B are slid along the edge of the ruler to mark columns of figures for a bookkeeper. Figures 3 and 4 indicate the clamps or markers B, and Figs. 1 and 2 show the clamps B in position on the ruler. This is a great advantage to a bookkeeper when he is entering figures in his book where the columns are not adjacent. Many bookkeepers enter figures in columns of varying widths apart and several in number, and between these columns are other columns which are to be filled in subsequently. He finds it convenient to cut out a strip of paper and lay the strip across the page as a marker, marking with red ink on it the columns of figures he wishes to be entered at that time. The use of this ruler takes the place of such home-made devices fully and in a superior manner. These clamp markers may be placed on either the upper or lower edge of the ruler, or they may be taken off altogether when not needed.

The lower edge of the ruler is divided into inch-scales, and each inch-scale is again divided into different scales. In Fig. 1, between lines 15 and 21, are shown these fractional divisions of an inch. The inch indicated by 1' is undivided; the inch indicated by 2' is divided into halves; 3', into thirds; 4', into fourths, and so on up to and including the inch indicated by 12'. Each inch is divided into the fractional parts of an inch, indicated by the number on that particular inch. Thus the ruler has, ready for use, a great many different divisions of an inch.

The upper edge of this ruler, as shown in Fig. 1, between lines 25 and 1, and 1 and 2 is divided into half, quarter, and eighth inches, exactly as shown in Fig. 1 of the drawing.

The scales, marks, and lines on this ruler being on the under face and sunk into the substance with a die, then inked and covered over with a flexible transparent film 15$^b$, are thus made durable and will not wear out, deface, or erase easily. On this account the ruler, if dusty or soiled with ink, may be readily washed or cleaned without injury. The fact that ink stains may be washed off gives it an advantage over the ordinary ruler of wood, into which the ink absorbs and can never be removed.

This ruler has longitudinal lines running parallel from one end to the other. The figures on these lines indicate the distance from the upper edge of the ruler that each line is. Each of these lines is one-eighth of an inch apart. Their use and advantage is found and recognized when drawing parallel lines a given distance from a given line.

This ruler has a round hole three-eighths of an inch in diameter, (indicated by the numeral 19, Fig. 1.) In location the center of this hole is the same point as the center of the two inches indicated by 1' and 2' of Fig. 1. The use and purpose of this hole is for hanging the ruler up on the desk or otherwise, as may be convenient when not in actual use.

The markers are made of any substance that contains sufficient spring to hold the markers on the ruler.

Another feature of this ruler is the straight slanting lines (indicated by numerals 26, 27, 28, 29, 30, 31, 32, 33, 34, 35, 36, and 37) drawn from the intersection of the respective inch-lines with the line 2 to a point connecting with the line used to show the last fractional division of that respective inch, (shown on the under face of the ruler between lines 15 and 21.) The use of these straight slanting lines is to more clearly indicate the fractional divisions of the respective inches between said lines 15 and 21.

This ruler has two bevels, one on each edge of the ruler, as shown by 47 and 48 in Fig. 2. Bevel 48 is from lines 1 to 25. Bevel 47 is from lines 15 to 21, as per Figs. 1 and 2. These bevels are a useful addition as having reference to a transparent ruler. By means of said bevels it is possible to avoid most of the objectionable effects of reflection and refraction of the lines and scales which are placed on the under side of the ruler. This is a useful feature as having reference to any kind of a transparent ruler.

The composition of this ruler may be of any substance having a sufficient degree of transparency and otherwise meeting the requirements of this specification, giving a preference to celluloid.

In the accompanying drawings, Figure 1 is a top plan view of my invention, universal ruler. Figure 2 is a cross-sectional view of the ruler and one of the markers cut on the line X X of Fig. 1. Figure 3 is a cross-sectional view of one of the markers. Figure 4 is a side elevation of one of the markers. Figure 5 is a top plan view of the ruler, its left-hand end broken away, showing the flexible transparent projection 15ª. As this figure is for the sole purpose of showing said projection, most of the lines and numerals shown on Fig. 1 are omitted. Figure 6 is a cross-sectional view of Fig. 1 cut on the line Y Y of Fig. 1, showing said projection 15ª, which projection, however, is not shown in Fig. 1.

My invention is described as follows:

In Fig. 1 the numerals 1', 2', 3', 4', 5', 6', 7', 8', 9', 10', 11', and 12' indicate, refer to, and are the numbers of and for the particular inches in which they are placed and are placed in the centers of the respective inches to which they allude.

14', 15', 16, and 17 indicate the four corners of the ruler, said corners being right-angled. The line 25, representing the upper edge of the ruler, is parallel with the line 21, representing the lower edge of the ruler.

This ruler is also provided with longitudinal parallel lines 1, 2, 3, 4, 5, 6, 7, 8, 9, 10, 11, 12, 13, 14, and 15, which lines extend the full length of the ruler, except where found necessary to discontinue the same.

This ruler is of flexible transparent material, and all scales and marks thereon are on its under side.

In Fig. 1, 18ᴬ, 18ᴮ, 18ᶜ, and 18ᴰ represent four round-headed screws or tacks or elevations in position on the ruler. They are on the upper face of the ruler and are preferably placed at intervals of one inch apart, except none are placed on the end lines of the ruler. (See Fig. 2.) Said elevations are about one-fourth of an inch from the upper edge of the ruler. In some rulers instead of using the tacks I have a transparent flexible extension 15ª, rising from the upper face of the ruler its entire length—about one-eighth of an inch tall and about one-fourth of an inch from the upper edge of the ruler. Each of said inch-lines 1' 2', &c., cross the ruler in a perfectly straight line at right angles to said lines 25 and 21, representing, respectively, the upper and lower edges of the ruler.

The numeral 19 indicates a circular perforation three-eighths of an inch in diameter. The center of said perforation is exactly the same as the center of the inch-spaces indicated by the numerals 1' and 2'.

The numeral 20, located at the center of the line 21, is a common point from which the lines of the protractor radiate. These radiating protractor-lines are five degrees apart, and, all told, there is indicated a scale of one hundred and eighty degrees. Theoretically these protractor-lines radiate from and will come to a vertex at said common point 20, though, as a matter of fact, they actually start from said longitudinal line 15. (See Fig. 1.) The reason the drawing does not show these lines between the lower edge of the ruler represented by the line 21 and the longitudinal line 15 is because of another scale essential to be shown in that space. Said five-degree protractor-lines are shown running from the common point 20 theoretically to their respective termini at vertical 40 and 43 and the top edge of the ruler, represented by the line 25. For the purpose of explanation and description several of these lines are denominated 29ᴬ, 29ᴮ, 29ᶜ, 38, 38ᴬ, 38ᴮ, 38ᶜ, 38ᴰ, and 39.

My ruler is also provided with vertical lines 41 and 42, which extend from said longitudinal line 2 to said line 15. Between said longitudinal lines 1 and 15 and between said vertical lines 40 and 41 and 42 and 43 spaces are reserved to show each of the said five degrees. Also in a space one-eighth of an inch wide, running from the line 41, inclusive, to the line 42, inclusive, between said longitudinal lines 1 and 2, are shown these same one-degree lines of the protractor.

In Fig. 1 between the lines 21 and 15 are shown fractional divisions of each respective inch—that is, the inch indicated by the numeral 1' is undivided, the inch indicated by 2' is divided into halves, by 3' into thirds, and so on up to the twelfth inch, indicated by the numeral 12', which is divided into twelve parts.

My improved ruler is also provided with straight slanting lines drawn from the intersection of the respective inch-lines with the longitudinal line 2 to a point connecting with the lines used to show the last fractional division of that inch. The use of these straight slanting lines is to more clearly indicate the fractional divisions of the respective inches between the line 21 and the line 15.

In Fig. 1 the line from the point 39 to the common point 20 indicates one of the inch-lines crossing the width of the ruler. The numeral 44 indicates the bend or spring of said markers B. The slanting line from 21 to 15 indicates the bevel on that edge of the ruler. This bevel is more particularly indicated by the numeral 47. The slanting line from 1 to 25 indicates the bevel of the other edge of the ruler and is more particularly shown by 48. Numerals 45 and 50 represent the arms of the marker B. The numerals 46 and 49 indicate a slight bevel inward of the ends of the arms of said marker, so as to enable it to be more easily slid on the ruler.

Rising from the upper face and near the upper edge of the ruler is a flexible transparent elevation 15ª, running the entire length of the ruler. (See Figs 5 and 6.)

All lines and markations are indented on the lower face of the ruler and are partly filled with ink or other non-transparent material and then said indentations are filled with flexible transparent material 15ᵇ.

Having described my invention, what I claim as new, and desire to secure by Letters Patent, is—

1. In a ruler, consisting of an oblong rectangular transparent strip, beveled at its upper and lower edges and provided with longitudinal parallel lines equidistances apart; vertical lines, running across the entire width of the ruler at right angles with said parallel lines, and dividing the ruler into inches; vertical lines, dividing said inches into eighths of inches, the lower edge of said ruler having the second inch divided into halves, its third inch into thirds, the fourth inch into fourths, and so on, the twelfth inch into twelfths, and straight slanting lines, extending from the intersection of said vertical inch-lines with the second longitudinal line from the upper edge of the ruler to the last fractional division-lines at the lower edge of the ruler, substantially as shown and described and for the purposes set forth.

2. As an article of manufacture, a ruler consisting of an oblong rectangular transparent strip beveled at its upper and lower edges and provided with longitudinal parallel lines equidistances apart, vertical lines, running across the entire width of the ruler at right angles with said parallel lines, dividing the ruler into inches, vertical lines dividing said inch-lines into eighths of inches, vertical lines, on the lower edge of the ruler, dividing each inch into fractional parts corresponding with the number of the inch; a longitudinal transparent extension, extending from the upper face of said ruler near its upper edge and running its entire length, straight slanting lines, extending from the intersection of said vertical inch-lines with the second longitudinal line from the upper edge of the ruler to the last fractional division-lines at the lower edge of the ruler, all lines and markations being indented in the under face of the ruler; opaque material, partly filling all lines and markations, and a transparent film, filling up all of said lines and markations, substantially as shown and described and for the purposes set forth.

3. In a ruler, consisting of an oblong rectangular transparent strip, beveled at its upper and lower edges, having indented in its lower face and at its center a protractor and provided with longitudinal parallel lines equidistances apart, vertical lines running across the entire width of the ruler at right angles to said parallel lines, dividing the ruler into inches; vertical lines, dividing said inches into eighths of inches, the lower edge of said ruler having the second inch divided into halves, its third into thirds, its fourth inch into fourths and so on, the twelfth inch into twelfths, and straight slanting lines, extending from the intersection of said vertical inch-lines with the second longitudinal line from the upper edge of the ruler to the last fractional division-lines of the lower edge of the ruler, substantially as shown and described and for the purposes set forth.

In testimony whereof I affix my signature in presence of two subscribing witnesses.

MILTON DEE BRYSON.

Witnesses:
E. EDGAR GALBRETH,
I. B. HAMILTON.